W. B. DUNN.
BRAKE BAND CONSTRUCTION.
APPLICATION FILED DEC. 15, 1919.
1,381,976.
Patented June 21, 1921.
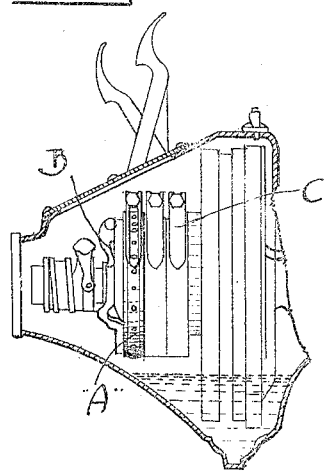
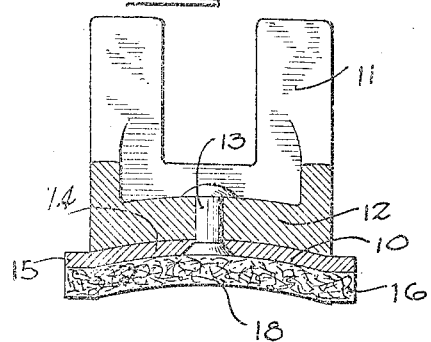
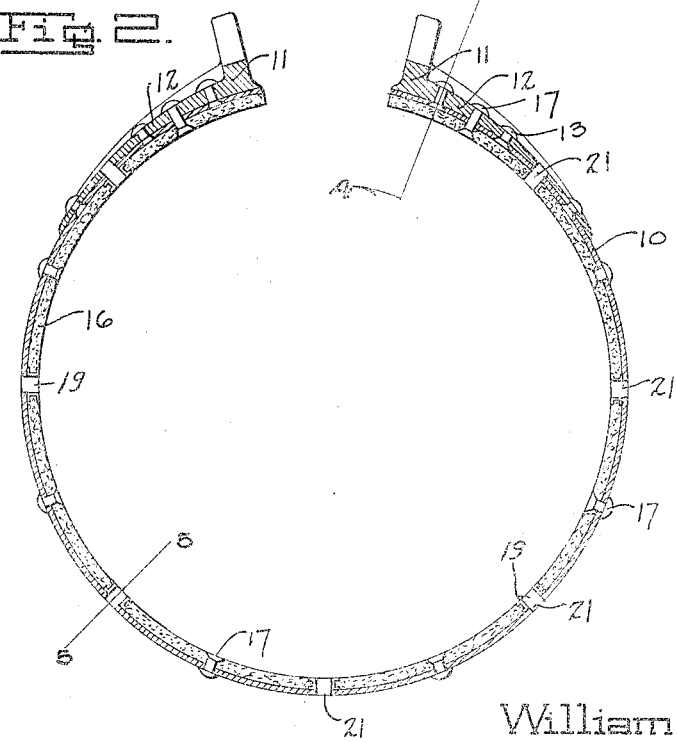
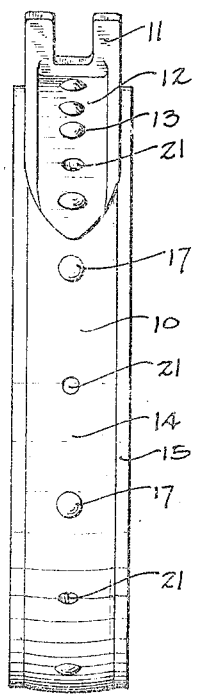
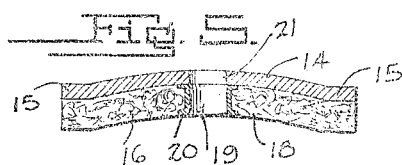
William B. Dunn.
Inventor

UNITED STATES PATENT OFFICE.

WILLIAM B. DUNN, OF DETROIT, MICHIGAN.

BRAKE-BAND CONSTRUCTION.

1,381,976.   Specification of Letters Patent.   Patented June 21, 1921.

Application filed December 15, 1919. Serial No. 344,872.

*To all whom it may concern:*

Be it known that I, WILLIAM B. DUNN, a citizen of the United States, residing at Detroit, in the county of Wayne and State of Michigan, have invented certain new and useful Improvements in Brake-Band Construction, of which the following is a specification.

This invention relates to brake bands, and the primary object of the invention is to provide an improved brake band for engaging the brake drum of a motor transmission, which is so constructed as to permit the lubrication thereof at all times, thereby preventing the wearing out of the lining of the band and the noise and clatter of the band during the operation thereof.

Another object of the invention is to provide an improved brake band having a circumferentially extending internal oil way formed therein, provided with radially extending openings arranged to catch and feed the oil through the oil way.

A further object of the invention is to provide an improved brake band so that the application of the band on the drum will be gradual, and permits a firm hold to be had by the brake band on the drum.

A still further object of the invention is to provide an improved brake band of the above character which is durable and efficient in use, one that is simple and easy to manufacture, and one which can be placed upon the market at a reasonable cost.

Other objects of the invention will appear in the following detailed description taken in connection with the drawings, forming a part of this specification, in which drawings:

Figure 1 is a fragmentary vertical section through a motor transmission casing showing the improved brake band applied to the transmission mechanism therein.

Fig. 2 is a central circumferential section through the improved band showing the same removed from the drum.

Fig. 3 is an end elevation of the band.

Fig. 4 is a detail transverse section taken on the line 4—4 of Fig. 2, and

Fig. 5 is a detail transverse section taken on the line 5—5 of Fig. 2.

Referring to the drawings in detail, wherein similar reference characters designate corresponding parts throughout the several views, the letter A indicates the improved brake band which is adapted to be applied to the brake drum B of the motor transmission construction C. The brake band is especially adapted for use on the brake drums of a transmission of a Ford motor car, but it is to be understood that the same can be used in connection with any other type of car that may be desired or where the same is applicable.

The improved brake band A includes the annular split ring 10 formed of flexible material, and the same is provided at or near the split therein with a pair of outstanding slotted ears 11, which are provided with attaching feet 12, which are riveted or otherwise secured to the brake band as at 13.

These portions of the brake band are adapted to coöperate with the other elements (not shown) of a transmission brake construction. The ring 10 is provided with a transversely curved or bowed central body section 14 having outstanding laterally projecting flat flanges 15. The flanges 15 are adapted to be brought into contact with the brake drum prior to the central portion of the brake band, and as the pressure on the band is increased the same will be flexed so as to bring the bowed or arcuate portion of the ring into engagement with the drum.

An inner lining 16 is provided for the ring 10 and is formed of any suitable braking material, such as canvas, felt, asbestos, cork or the like and it is formed of an annular split rim construction and is secured to the band 10 by rivets or bolts 17, which are arranged at equi-distantly spaced points. The lining 16 conforms to the configuration of the band 10 and the arcuate or curved portion thereof defines an annular oil way 18 so as to permit the oil to extend around the band which provides a cooling medium without impairing the gripping properties of the lining itself. The lining 16 is provided at equi-distantly spaced points with centrally located openings 19, which are reinforced by suitable metallic eyelets 20 which facilitate the flow of the oil into the oil way 19. The openings 19 register or aline with openings 21 formed in the brake band, and these openings lie intermediate the fastening bolts or rivets 17.

The openings 21 and 19 formed in the brake ring 10 and the lining 16 are adapted to catch the oil as the same is splashed up against the outer surface of the ring and these openings permit the oil to flow into the channel 18 provided for that purpose.

During the application of the brake, the ring and the lining will be applied gradually to the brake drum as heretofore stated, and the bowed arcuate portions will be gradually flexed so as to bring the bowed outer arcuate portions into engagement with the brake drum. However, the flexing of the ring and lining will not be sufficient to entirely destroy the circumferential channel 18 but still permits a limited space for the movement of oil around the same.

From the foregoing description it can be seen that an improved type of brake band has been provided which will effectively prevent the burning out of the lining of the band and permit the application of the brake band to be applied to the drum and absolutely eliminate all clatter and accidental gripping of the band on the drum.

Changes in details may be made without departing from the spirit or scope of my invention.

I claim:

1. A flexible brake band having a circumferentially extending channel formed therein.

2. A brake band having an arcuate circumferentially extending flexible bowed body.

3. A brake band comprising a flexible split ring having an arcuate circumferentially extending centrally disposed bowed portion, and outwardly extending laterally projecting flanges and an inner lining arranged to conform to the configuration of the ring, and means for securing the lining to the ring.

4. A brake band comprising a ring, a lining secured to the inner surface of the ring, said lining and ring having a circumferentially extending transversely curved body portion, said body portion having radially extending openings formed therein.

5. A frictional grip brake drum comprising an annular split ring formed of flexible material and including an arcuate longitudinally extending central body portion and outwardly projecting flanges, an inner lining riveted to the ring having a centrally disposed longitudinally extending curved body portion, and outwardly extending flanges, the ring and lining having registering openings formed therein adapted to catch oil thrown upon the outer surface of the band.

6. A lining for brake bands including a transversely curved circumferentially extending body portion, and outwardly extending flanges, the body portion having radially extending openings formed therein, and eyelets carried by the walls of the openings.

7. A brake band comprising an arcuate circumferentially extending flexible bowed body, and outwardly extending flanges formed on the side edges of the body.

WILLIAM B. DUNN.